United States Patent
Chelliah et al.

(10) Patent No.: US 11,232,474 B2
(45) Date of Patent: Jan. 25, 2022

(54) INFINITE-LOOP DETECTOR FOR DYNAMIC WEBSITES AND APPLICATIONS

(71) Applicant: Optimizely, Inc., San Francisco, CA (US)

(72) Inventors: Nikhil Eshwar Chelliah, San Francisco, CA (US); James Frazier Fox, San Francisco, CA (US)

(73) Assignee: Optimizely, Inc., San Francisco, CA (US)

( * ) Notice: Subject to any disclaimer, the term of this patent is extended or adjusted under 35 U.S.C. 154(b) by 316 days.

(21) Appl. No.: 16/410,964

(22) Filed: May 13, 2019

(65) Prior Publication Data

US 2020/0364742 A1 Nov. 19, 2020

(51) Int. Cl.
| | | |
|---|---|---|
| *G06F 17/00* | (2019.01) | |
| *G06Q 30/02* | (2012.01) | |
| *G06F 16/958* | (2019.01) | |
| *G06F 11/34* | (2006.01) | |
| *G06F 11/36* | (2006.01) | |
| *G06F 11/30* | (2006.01) | |

(Continued)

(52) U.S. Cl.
CPC ....... *G06Q 30/0243* (2013.01); *G06F 11/302* (2013.01); *G06F 11/3438* (2013.01); *G06F 11/3692* (2013.01); *G06F 16/958* (2019.01); *G06F 40/14* (2020.01); *G06F 40/197* (2020.01)

(58) Field of Classification Search
CPC ... G06Q 30/0243; G06F 40/14; G06F 40/197; G06F 16/958; G06F 11/3438; G06F 11/3692; G06F 11/302; G06F 40/143
See application file for complete search history.

(56) References Cited

U.S. PATENT DOCUMENTS

2006/0230348 A1* 10/2006 Fahmy ................. G06F 9/451
715/700
2010/0218049 A1* 8/2010 Mostow ............. G06F 11/3692
714/38.14

(Continued)

OTHER PUBLICATIONS

Kiciman et al., "Ajax Scope: A Platform for Remotely Monitoring the Client-Side Behavior of Web 2.0 Applications," 2007, SOSP'07, p. 17-30 (Year: 2007).*

(Continued)

*Primary Examiner* — Andrew T McIntosh

(74) *Attorney, Agent, or Firm* — Womble Bond Dickinson (US) LLP

(57) ABSTRACT

A method of avoiding infinite loops of changes to a dynamic web page to display on a client device includes displaying the dynamic web page received from a content provider on the client device, wherein the dynamic web page comprises a modified element having an original modification. The method further includes receiving an indication that the modified element was updated to generate an updated modified element. The method further includes, in response to receiving the indication, determining, by a processing device, that reapplying the original modification to the updated modified element would result in an infinite loop on the dynamic web page. The method further includes, based on the determination, displaying the updated modified element on the dynamic without reapplying the original modification to the updated modified element.

17 Claims, 8 Drawing Sheets

(51) Int. Cl.
*G06F 40/14* (2020.01)
*G06F 40/197* (2020.01)

(56) References Cited

U.S. PATENT DOCUMENTS

| | | | | |
|---|---|---|---|---|
| 2010/0229052 A1* | 9/2010 | Cuneo | ................ | G06F 11/0709 |
| | | | | 714/57 |
| 2013/0231969 A1* | 9/2013 | Van Pelt | .......... | G06Q 10/06311 |
| | | | | 705/7.13 |
| 2017/0212687 A1* | 7/2017 | Kelly | ................ | G11C 14/0009 |
| 2018/0032340 A1* | 2/2018 | Ibing | ................... | G06F 11/0706 |

OTHER PUBLICATIONS

Kling et al., "Bolt: On-Demand Infinite Loop Escape in Unmodified Binaries," 2012, OOPSLA'12, p. 431-450 (Year: 2012).*

* cited by examiner

INFINITE-LOOP DETECTOR FOR DYNAMIC WEBSITES AND APPLICATIONS

FIELD OF TECHNOLOGY

The embodiments described herein pertain in general to conducting experiments on a web page or digital product and more particularly, to infinite-loop detection for dynamic web pages and applications.

BACKGROUND

Content variation testing is a type of experiment that tests one item of content against a different item of content. One example of content variation testing is web page variation testing where an experiment is conducted that tests an existing web page (or one or more elements on the page against a variant design of the web page (or one or more variants of the elements on the page). During variation testing of a web page, user interaction with a web page or its variants is measured (for example, whether a user clicks on a button or a variant of a button), and the effects of the modifications to a web page (or its elements) that produce positive or negative results are determined. The positive results associated with a particular modification to a web page validates that the modification to the web page should be used in a production version of the web page.

Figure 1:
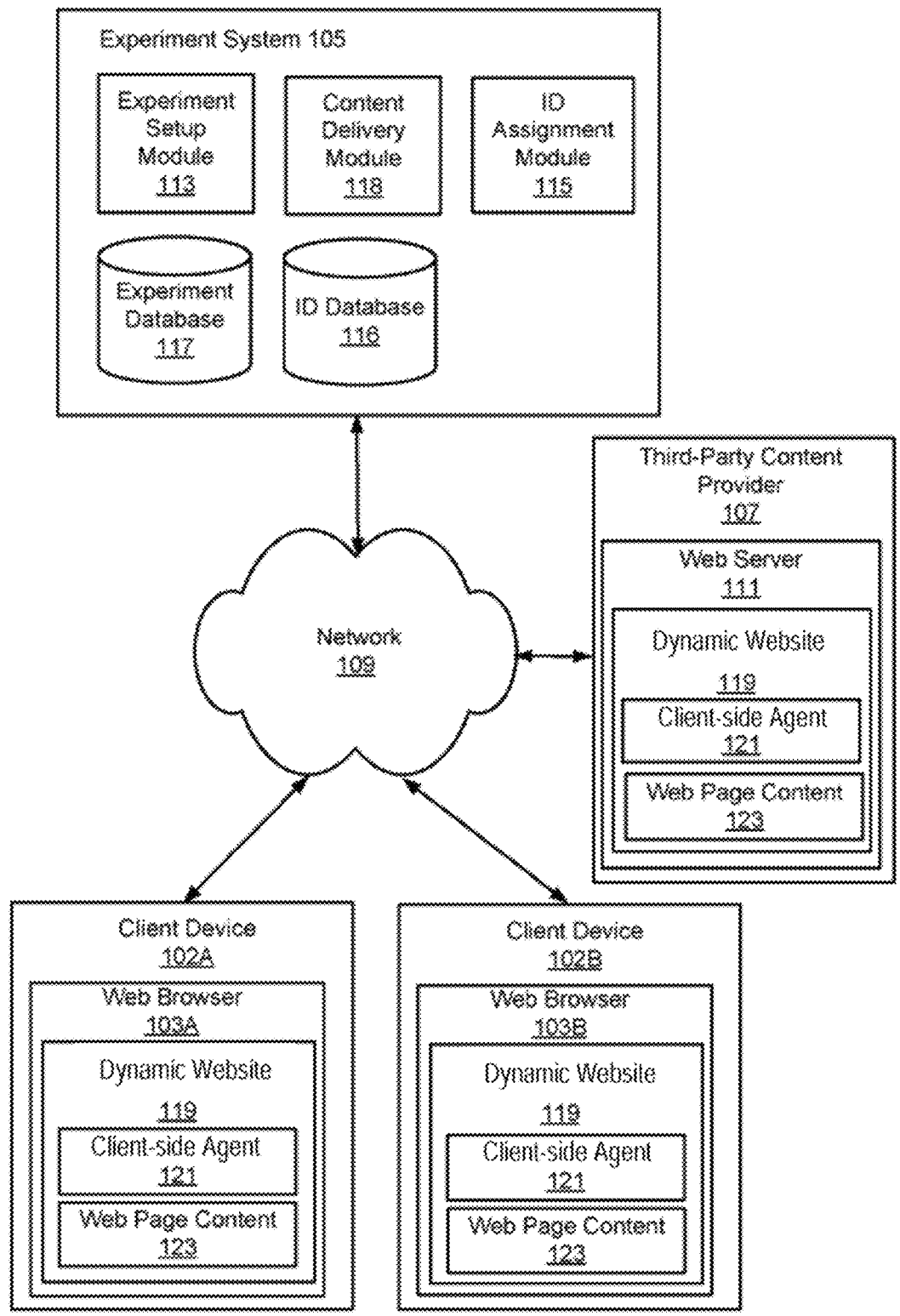
FIG. 1 is a block diagram of an experiment system environment, according to one embodiment.

The FIGS. depict an embodiment for purposes of illustration only. One skilled in the art will readily recognize from the following description that alternative embodiments of the structures and methods illustrated herein may be employed without departing from the principles described herein.

DETAILED DESCRIPTION

Content providers may run content experiments such as A/B tests (e.g., variation testing) to answer specific questions regarding which variation of a content item such as a web page or digital product (including various features) is more successful. Many content experiments include visitor criteria that determines whether a visitor is eligible for the experiment and if so, which variations of the content experiment should be shown to the visitor. The systems that implement these content experiments may be implemented in the backend of the content provider's system or as a separate node that communicates with the back end of the content provider's system. Simultaneously, content providers may bring up content delivery networks (CDNs) in the front-end of their systems to provide for content caching, including caching of content experiment variations.

In some embodiments, experiment systems are designed to work with static websites. A static website is a website whose web pages do not change after they are initially served and initially modified by an experiment system. Experiment systems may detect and modify the static web pages as visitors navigate the web pages, modifying pages immediately such that visitors only see the modified page, if necessary.

In some embodiments, experiment systems are expected to operate with single-page applications and other dynamic websites and dynamic applications. A dynamic web application or dynamic website is a web application or website that may interact with a client device by updating the web page rather than loading an entire new page from a server. Dynamic websites are intended to avoid interruption of the user experience between successive page loads. In a single-page application, a type of dynamic web application, all the necessary code is typically retrieved with a single page load or the appropriate resources are dynamically loaded and added to the page as necessary, usually in response to user actions.

Some experiment systems may have difficulty conducting variation tests on dynamic websites because the experiment system may load once in the header element of the dynamic website, while the body of the application can change an unbounded number of times, typically as a result of user action. As a user navigates a dynamic website (and changes the state of the page, either visibly or invisibly), some experiment systems may have difficulty detecting trigger conditions to activate or reactivate an experiment since the header element of the dynamic website does not necessarily reload. Even if a condition is not true at first, it may become true as the visitor navigates through the site, but the client of some experiment systems may have no way of knowing when it should check again given that dynamic websites load, only once.

Furthermore, some experiment systems conducting variation tests on dynamic websites may encounter an issue, in which a conflict arises between the original content of the application and modified content produced by an experiment. In some situations, such a conflict can result in a potentially-infinite loop of back-and-forth changes between the experiment system and other application or non-application code, which may cause the web application to become unstable. Advantageously, the embodiments herein describe experiment system behaviors for overcoming the above difficulties, and others.

FIG. 1 is a block diagram of a variant testing system environment 100 according to one embodiment. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to an experiment system 105 and a third-party content provider 107 via a network 109. Although the environment 100 shown in FIG. 1 only includes two client devices 102, the environment 100 can include any number of client devices (e.g., thousands of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

The network 109 enables communication among the entities connected to it. In one embodiment, network 109 is the Internet and uses standard communications technologies and/or protocols. Thus, network 109 can include links using technologies such as Ethernet, Wi-Fi (e.g., 802.11), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multiprotocol label switching (NIPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 communicate with the third-party content provider 107 via the network 109 to receive content items such as web pages from the third-party content provider 107. In one embodiment, each client device 102 is a computer system capable of communicating with the experiment system 105 and the third-party content provider 107. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). The web browser 103 is a computer program stored on a client device 102 that allows the user of client 102 to access web pages on the World Wide Web such as dynamic websites 119 provided by the third-party content provider 107. Suitable web browsers include, but are not limited to, GOOGLE CHROME, MICROSOFT INTERNET EXPLORER, MICROSOFT EDGE, MOZILLA FIREFOX, and APPLE SAFARI. In addition to web browsers, a client device may process a web pave in an environment like NODE.JS, or in any environment in which an experiment system and other third-party content providers may execute JavaScript code via an interpreter with support for microtask and macrotask queues.

As mentioned above, the environment 100 includes a third-party content provider 107. Hereinafter, the third-party content provider 107 is referred to as a "content provider 107" for ease of description. The content provider 107 may be an individual, a group of individuals, or an entity such as a company. In one embodiment, the content provider 107 provides content items to client devices 102. While only one content provider 107 is shown, it is understood that any number of content providers are supported and can be in the environment 100 at any time.

In one embodiment, the content items provided by the content provider 107 are included as part of a dynamic website 119. For example, the content provider 107 may provide content items such as navigation bars, backgrounds, call to action buttons, links, CSS styles, pop-ups, video, audio, a combination of video and audio, still images (e.g., JPEG), text documents, advertisements, and/or any other types of content. For purposes of convenience and the description of one embodiment, the content items provided by the content provider 107 will be referred to as dynamic web pages, but no limitation on the type of content items are intended by this terminology. In one embodiment, a dynamic web page refers to a view of a dynamic website 119. For example, a dynamic web page may be the initial view of a dynamic s website 119 when the user first loads the dynamic website 119 or the view when the user navigates over a navigation bar element and a menu is displayed in response to the navigation over the navigation bar. In other embodiments, a dynamic web page may refer to a view of any other type of dynamic website or dynamic application. In other embodiments, a dynamic web page may refer to a web page that does not necessarily update after it has loaded, except insofar as it is modified by an experiment system.

In one embodiment, the content provider 107 operates in conjunction with the experiment system 105 to perform variation testing on a dynamic website 119 containing one or more dynamic web pages. In one embodiment, the content provider 107 sends a dynamic web page to client devices 102 together with a client-side experimentation agent 121, which includes or subsequently downloads from the experiment system 105 conditions and instructions for modifying the dynamic web page. A variation test for a dynamic web page of a dynamic website 119 tests one variation of a dynamic web page against another variation of the dynamic web page (e.g., the original version of the dynamic web page) to determine how each variations influences user interaction with the web page or whether the changes produce a desired result. An example of a desired result resulting from a change to a dynamic web page is an increased interaction with the web page such as an increased selection of an advertisement(s) included in the dynamic web page or increased purchases of a product advertised on the dynamic web page. Thus variation testing can validate a new design of a dynamic web page or changes to elements on the dynamic web page before the new design or changes are put into production by the content provider 107.

For a given dynamic web page, the content provider 107 may have one or more variations of the dynamic web page that are used in a variation test for the dynamic web page. In one embodiment, a variation test of a dynamic web page involves an experiment that tests control "A" and variant "B" on users requesting the dynamic web page from the content provider 107. For ease of discussion, the embodiments discussed herein describe a web page having only two variations: the control and the variant. However, in other embodiments, a dynamic web page can have any number of variations.

Figure 2B:
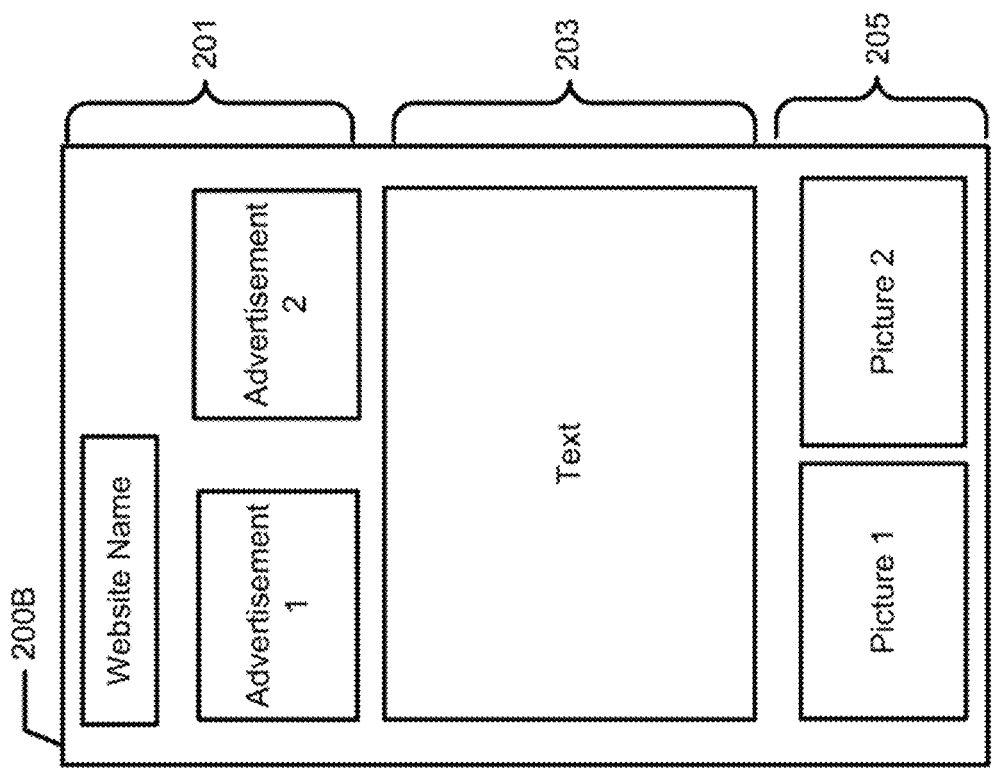
FIGS. 2A and 2B are example variations of a web page, according to one embodiment.
Figure 2A:
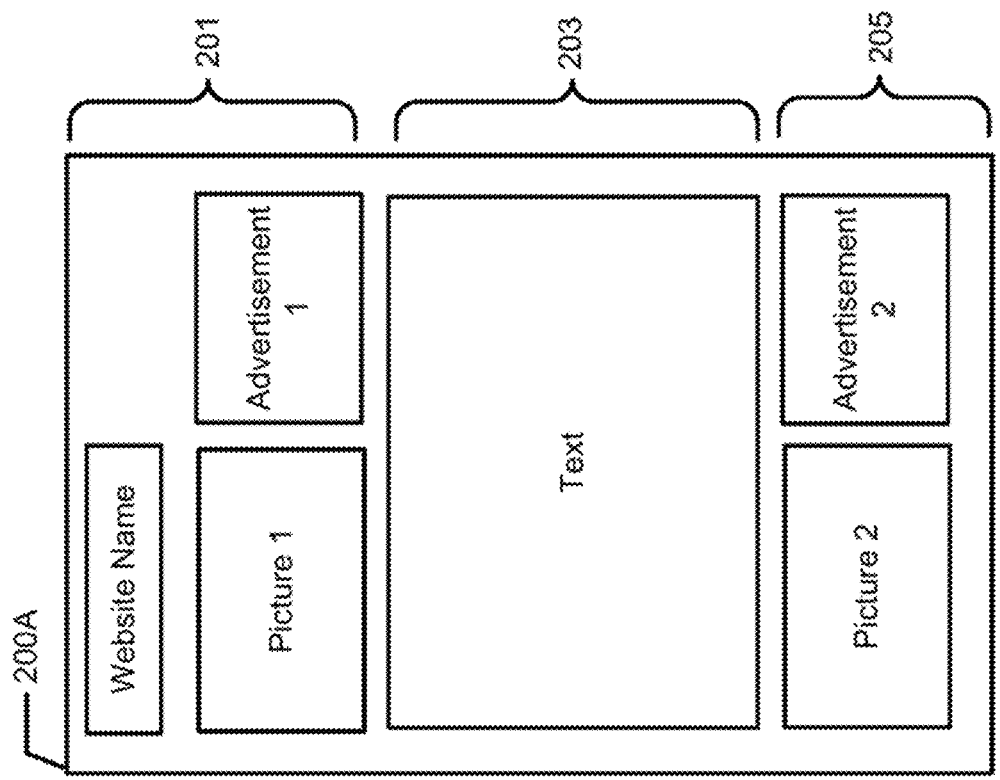

FIG. 2A is example "A" (e.g., the control variation) of a dynamic web page 200A that represents the current implementation of the dynamic web page provided by a content provider 107. The control variation of the dynamic web page 200A includes a website name of the website associated with the dynamic web page, a first picture, and a first advertisement. The website name, the first picture, and the first advertisement are located in an upper portion 201 of the control of the dynamic web page 200A according to one embodiment. The control variation of the dynamic web page 200A also includes textual content located in a central portion 203 of the control variation of the dynamic web page 200A and the control variation of the dynamic web page 200A also includes a second picture and a second advertisement located at a lower portion 205 of the control variation of the dynamic web page 200A.

FIG. 2B is example "B" (e.g., the variant version) of a dynamic web page 200B. The variant of the dynamic web page represented by web page 200B includes a change (i.e., a modification) to the control variation of the dynamic web page 200A shown in FIG. 2A. The variant of the dynamic web page 200B includes the website name, a first advertisement, a second advertisement, textual content, a first picture, and a second picture similar to the contents of the control variation of the dynamic web page 200A shown in FIG. 2A. However, the variant of the dynamic web page 200B includes the second advertisement positioned in the upper portion 201 of the dynamic web page 200B whereas the second advertisement is positioned in the lower portion 205 in the control variation of the dynamic web page 200A. In one embodiment, the variation test using the control and the variant of the dynamic web page is conducted to determine whether the second advertisement receives more selections when the second advertisement is located at the lower portion 205 of the dynamic web page as shown in FIG. 2A or when the second advertisement is located at the upper portion 201 of the dynamic web page as shown in FIG. 2B.

Referring back to FIG. 1, in one embodiment the content provider 107 includes a web server 111. In one embodiment, the web server 109 links the content provider 107 to one or more client devices 102 and the experiment system 105 via the network 109. The web server 111 serves dynamic websites 119, as well as other web related content 123 for the dynamic website 119, such as Java, Flash, XML, and so forth. The web server 111 may include a mail server or other messaging functionality for receiving and routing messages between the experiment system 105 and one or more client devices 102. In one embodiment, a dynamic website 119 provided by the web server 109 may include a client-side experimentation agent 121. The client-side experimentation agent 121 may be added to the dynamic website 119 by the third-party content provider 107 in one embodiment. The client-side experimentation agent 121 comprises code that loads experiment variation instructions from the experiment system 105.

As shown in FIG. 1, the variant testing system environment 100 also includes an experiment system 105. In one embodiment, the experiment system 105 establishes and conducts variation experiments for web pages included in dynamic websites 119 served by third party providers 107. In one embodiment, the experiment system 105 includes an experiment setup module 113, an ID assignment module 115, an ID database 116, an experiment database 117, and a content delivery module 118, according to one embodiment. As is known in the art, the term "module" refers to computer program logic utilized to provide the specified functionality. Thus, a module can be implemented in hardware, firmware, and/or software. In one embodiment, program modules are stored on a non-transitory storage device i.e., a computer program product), loaded into a memory, and executed by one or more computer processors. Additionally, those with skill in the art will recognize that other embodiments of the experiment system 105 shown in FIG. 1 can have different and/or other modules than the ones described here, and that the functionalities can be distributed among the modules in a different manner.

In one embodiment, the experiment setup module 113 establishes experiments for dynamic websites 119 provided by the third-party content provider 107. The experiment setup module 113 receives input from an affiliate (e.g., an employee) of the third-party content provider 107 to establish a variation experiment for a dynamic web page of a dynamic website 119 provided by the third-party content provider 107. In one embodiment, establishing a variation experiment for a dynamic web page of a dynamic website 119 includes defining or characterizing a component, or view, or smart page within the dynamic web page. In one embodiment, a component for a dynamic web page is a set of descriptors or instructions that indicate when to activate a variation experiment associated with the dynamic web page. The component definition may include one or more triggers and one or more conditions configured by the affiliate of the third-party content provider 107 that impact when variations of the associated dynamic web page are selected and presented to a client device 102.

A component definition for a dynamic web page may include one or more conditions. In one embodiment, a condition(s) for a component definition is a set of rules related to the state of the dynamic web page that must be satisfied before any component-specific variation changes will be applied to the dynamic web page. That is, a component's conditions can be used to evaluate the state of the dynamic web page to a value of true (i.e., valid) or false (i.e., invalid). Depending on whether its conditions evaluate to true, a component may cause the experiment system to apply certain changes in order to display a particular variation within an experiment. For example, information included in the component definition specifies when and how to present experimental variations of the dynamic website 119 to viewing users when the component is active. If the conditions evaluate to false, the component and its variations may be deactivated if the component was previously active, or the component may not be activated if not already activated.

In one embodiment, a component definition for the dynamic web page may also include at least one trigger. In one embodiment, a trigger defines when to evaluate the condition(s) that determine whether the component is active within the dynamic web page. That is, a trigger may be tied to events on the dynamic web page and may thereby signal a client device 102 to evaluate the conditions for the associated component. Component definitions may include one or more triggers that can be of different trigger types. Each time a trigger event occurs for a defined component, the component's conditions may be evaluated to determine whether the component is active.

Figure 3A:
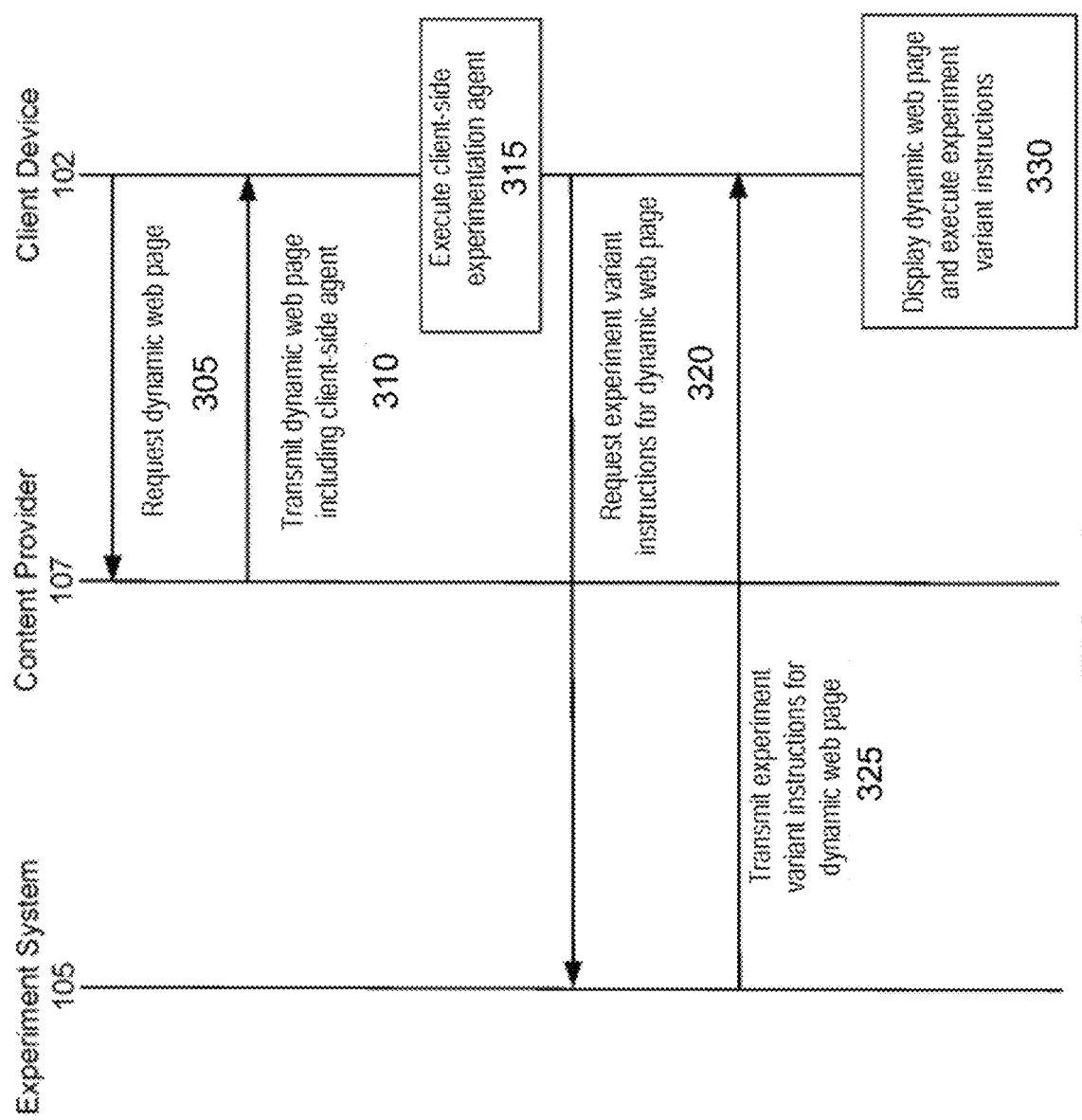
FIGS. 3A-3B are transaction diagrams illustrating interactions between an experiment system, a content provider, and a client device, according to one embodiment.
Figure 3B:
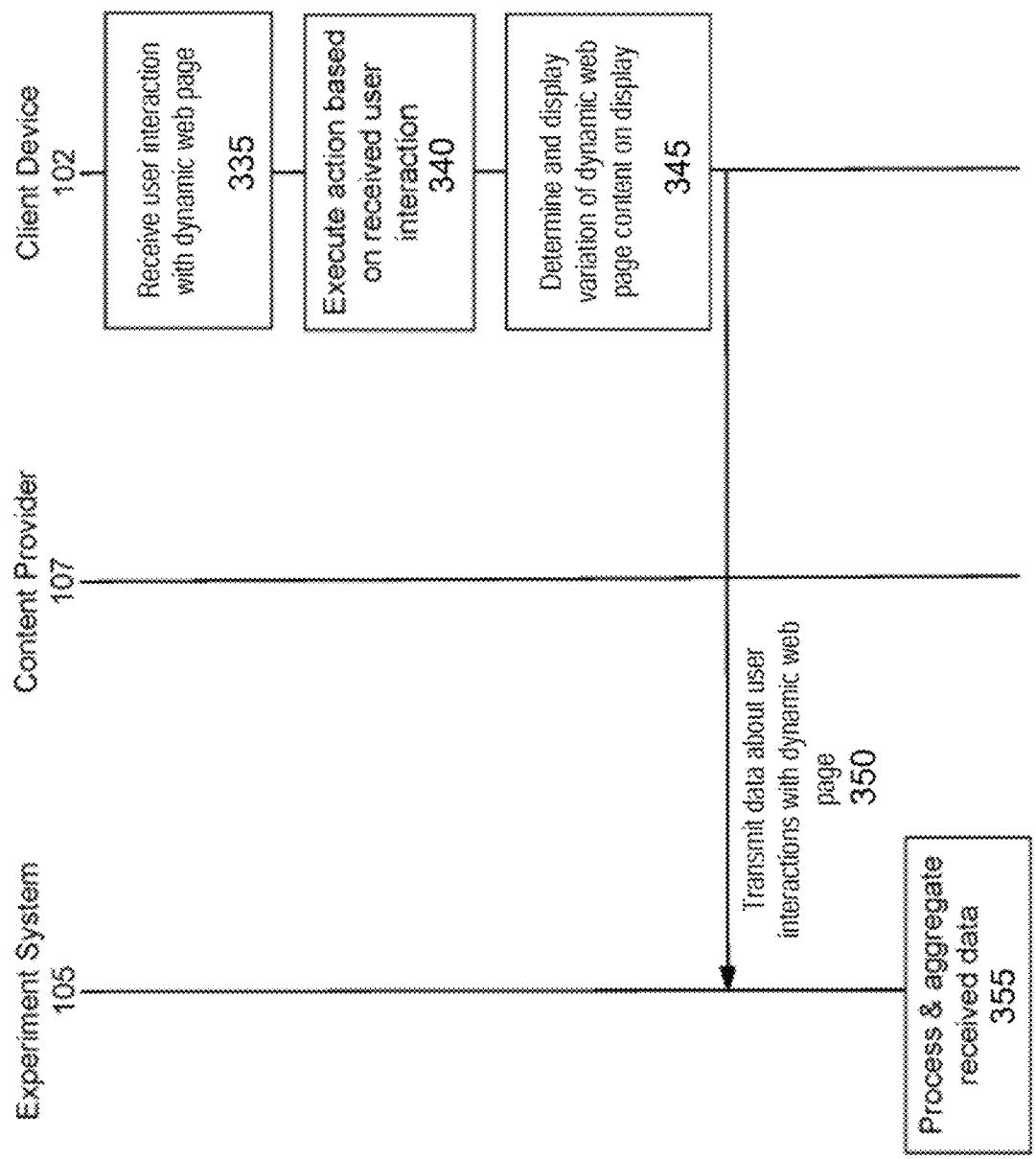

FIGS. 3A-3B are transaction diagrams illustrating interactions between an experiment system 105, a content provider 107, and a client device 102. In one embodiment, the experiment system 105 may be on the client device 102. In another embodiment, the experiment system 105 is separate from the client device 102, as shown. A client device 102 requests 305 a dynamic website 119 from a content provider 107. The content provider 107 transmits 310 the dynamic website 119 to the client device 102. The transmitted dynamic website 119 includes a client-side experimentation agent 121. The client-side experimentation agent 121 includes instructions that cause the client device 102 to retrieve from the experiment system 105 additional configurations or variations to perform alterations on the web page or its content (e.g., web page elements), including, in one embodiment, the triggers and conditions for one or more defined components. The client device 102 executes 315 the client-side experimentation agent 121 which causes the client device 102 to request 320 instructions for executing experiment variants for a dynamic web page of the dynamic website 119 from the experiment system 105. The experiment system 105 transmits 325 the experiment variant instructions for the dynamic web page of the dynamic website 119 to the client device 102. The instructions include the triggers and conditions for the component definitions and where they are stored in the client-side experimentation agent 121 within the web browser 103. The client device 102 displays 330 the dynamic web page to a user of the client device 102 and executes the web browser 103 and the client-side experimentation agent containing the experiment variant instructions.

The client-side experimentation agent 121 contains instructions to allow it to interact with the web browser 103, including instructions to interact with the web browser's APIs. For example, the client-side experimentation agent 121 contains instructions to interact with the MutationObserver API. The MutationObserver API provides the ability to watch for changes being made to the DOM tree by identifying a target element. The target element may be a single node in the DOM tree or a subtree including multiple nodes. When a change occurs to the identified target element, such as adding, modifying, and removing nodes or node attributes and modifying text data, additional code can be configured using the MutationObserver API to watch for changes and transmit them to the client-side experimentation agent 121. In another example, the client-side experimentation agent 121 interacts with a site visitor's web browser session history. In one example, the client side experimentation agent 121 detects when a URL changes even if the full page does not reload in order to execute experiments.

Referring to FIG. 3B, the client device 102 receives 335 a user's interactions with the dynamic website 119 that has been loaded onto the browser running on the client device 102. For example, the client device 102 identifies a user interaction of clicking or selecting a menu item of the dynamic web page and passes the user interaction to the browser for execution by the dynamic website 119. The client device 102 executes 340 an action associated with the user interaction in the browser. The action executed by the client device 102 includes, displaying the selected menu item (e.g., updating an element of the web page). The client device 102 determines 345 a variation of the dynamic web pave to display (e.g., including a variation of an element to display) to the user based on the experiment variant instructions and the user interactions, as discussed in conjunction with FIG. 4. Responsive to the client device 102 displaying the determined variation of the dynamic web page, the client device 102 using the client-side experimentation agent may monitor for changes to the state of the dynamic web application 119 and transmit 350 data about user interactions with the dynamic web page to the experiment system 105. The experiment system 105 processes and aggregates 355 the received data.

Figure 4:
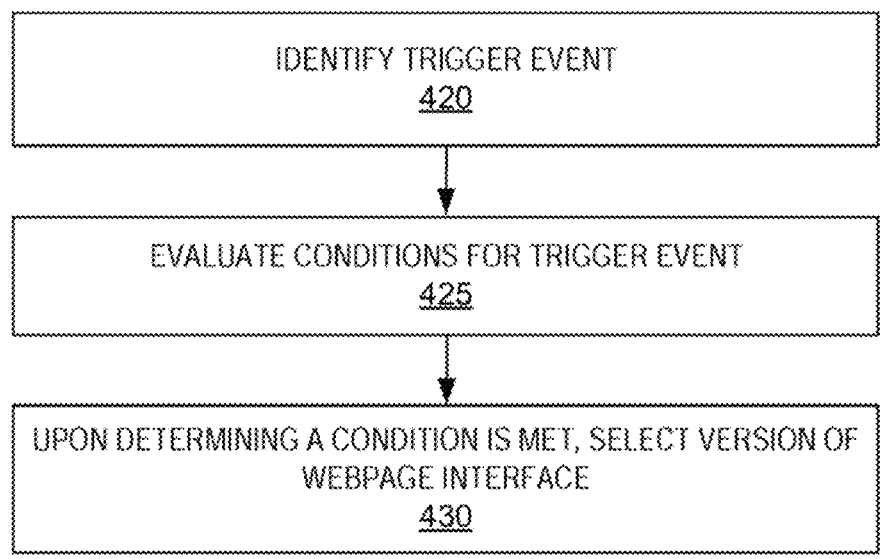
FIG. 4 is a flow diagram of a method of determining a variation of a web page for a content variation experiment, according to one embodiment.

FIG. 4 is an example flowchart of a process for determining a content variation of a web page for a content variation experiment. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by client device 102 of FIG. 1. Some or all of the steps may be performed by other entities in other embodiments. In addition, other embodiments may include different and/or additional steps, and the steps may be performed in different orders.

The steps of FIG. 4 may be performed on the client device 102. The client device 102 evaluates the state of the dynamic website 119 to identify 420 whether a trigger event associated with the dynamic web page has occurred. As previously discussed, trigger events are received as part of the experiment variant instructions received from the experiment system 105. The trigger event describes when the client device 102 evaluates for conditions associated with a component within the dynamic web page. For example, the trigger event may include a selection of an element of the web page, a change to the URL of the web page, a polling event that occurs at specified time intervals, a manual trigger, or another event. Thus, the client device 102 monitors the dynamic website 119 for the occurrence of the trigger event. In one embodiment, the client-side experimentation agent 121 is monitoring the dynamic website 119 by interacting with the above-described web browser APIs.

The client-side experimentation agent 121 then evaluates 425 conditions associated with the trigger event responsive to the trigger event occurring on the dynamic web page. In one embodiment, the condition evaluates the state of the dynamic web page. Each component may have zero or more conditions, and any combination of condition types. For example, conditions may include a specified URL match, an element presence on the web page, an element visible on the web page, custom code associated with the web page, and other state information associated with the web page. As the user is interacting with the web page, the content of the web page is dynamically updated. The client device 102 monitors the updated content (e.g., an updated element) to determine whether one or more conditions are net. Upon determining that one or more conditions is met, the experiment is activated and the client device 102 selects 430 a variation (e.g., the control or the variant) of the updated content (e.g., a modified element) of the web page interface to display to the viewing user as specified in the experiment variant instructions.

For example, if the user of client device 102 clicks on a menu item on the dynamic web page, the content elements on the dynamic web page change, reflecting that the user has navigated to the menu item they clicked on. The client device 102 detects that the content element has changed on the page. In other examples, the client device 102 detects that a URL change has occurred. In one embodiment, the client device 102 evaluates the conditions (for example, a content element exists on the page) and, if the conditions evaluate to true, the component activates that evaluates the experiment for that set of conditions.

Returning to FIG. 3B, the client device 102 displays 345 the determined variation of the dynamic web page to the user. The client device 102 identifies and transmits 350 data about user interactions with the dynamic web page to the experiment system 105. For example, the client device 102 identifies whether a user clicks on elements of the dynamic web page, makes a purchase, closes out, or otherwise interacts with the variation of the dynamic web page. The experiment system 105 processes and aggregates 455 the received data for analysis.

Figure 5:
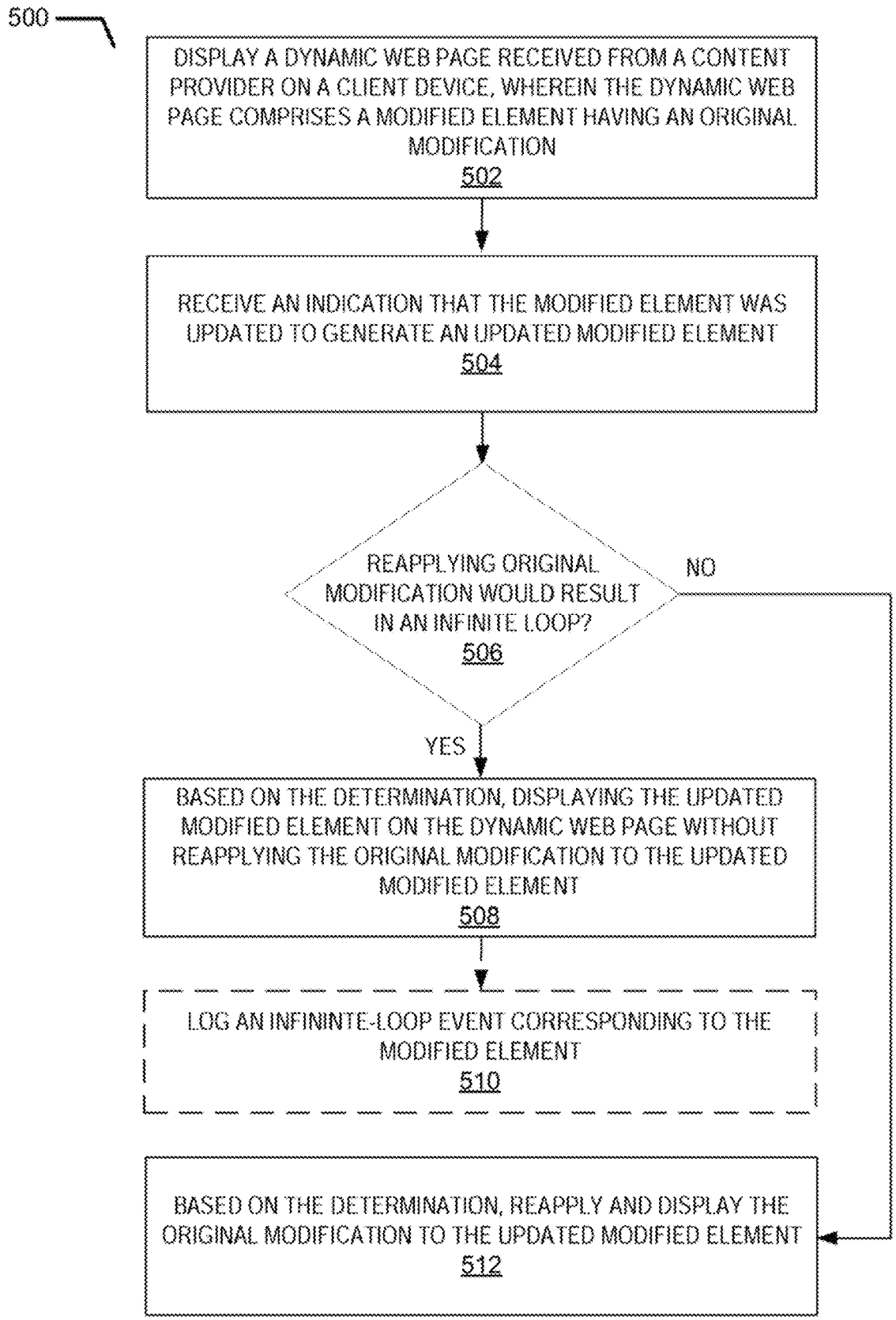
FIG. 5 is a first flow diagram of a method of infinite-loop detection for dynamic websites and applications, according to one embodiment.

FIG. 5 is a first flow diagram of a method of infinite-loop detection for dynamic websites and applications, according to one embodiment. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by client device 102 of FIG. 1. Some or all of the steps may be performed by other entities in other embodiments. In addition, other embodiments may include different and/or additional steps, and the steps may be performed in different orders.

The method 500 begins at block 502, in which processing logic displays a dynamic web page (e.g., "the web page") received from a content provider on a client device. In one embodiment, the dynamic web page comprises an element, having an original modification (e.g., applied by the experiment system), as described herein. For example, an element may be a picture, song, video, text, color, or any other representation. In one example used herein, the element may be the title of a web page. The original headline may be "Read all About it!" while a modified headline (e.g., a modified element) may be "Extra! Extra! Read all About it!" In the current example, the experiment system would modify the dynamic web page to display the modified headline.

At block 504, processing logic receives an indication that the modified element was updated to an updated element. In one embodiment, the modified element is updated via outside of a current event-loop macrotask (e.g., via polling). Additional details describing microtasks and macrotasks are described with respect to FIG. 6. In one embodiment, the modified element (e.g., "Extra! Extra! Read all About it!") may be updated back to the original headline, or to something else entirely. In various embodiments, there are any number of reasons why an element may be updated away from a modified version produced by an experiment system. The element may be updated by a third-party content provider in response to user action, for example. In some situations, the updating of the element may cause the experiment system running on the web page (e.g., in a JavaScript script) to attempt to re-modify the updated, modified element (e.g., replicate the original modification, now applying it to the updated element). Described herein, the term "revert" may refer to either redisplaying the original modified element, or reapplying the original modification to a now-updated element, interchangeably. This in turn may cause the third-party content provider (or other server/device) to again attempt to re-update the modified updated element. If this cycle continues in an infinite loop or for a finite but large number of iterations in a time period, the performance of the web page may decrease. Advantageously, the embodiments described herein overcome this issue.

At block 506, in response to receiving the indication, processing logic determines (e.g., by a processing device), whether reapplying the original modification to the updated modified element would result in performance degradation of the dynamic web page. One way in which processing logic may determine that reapplying the original modification to the updated modified element would result in performance degradation is by determining that the element, across all its updates and modifications, has been modified or re-modified (e.g., modifications have been applied and/or reapplied) more than a threshold number of occurrences within a sliding-window time period. Additional details describing how processing logic makes such a determination are described with respect to FIG. 6.

At block 508, if the determination is true, processing logic displays the updated modified element on the dynamic without reapplying the original modification to the updated modified element. In other words, processing logic may, in response to determining that a web page may suffer performance degradation (e.g., overheating), prevent experiment system code from reapplying an experiment-system modification to the updated element. Advantageously, this may prevent the updating of the element from negatively impacting the performance of the web page. Continuing with the example above, if processing logic detects that the third-party content provider is continually requesting that headline element be updated to "Read all About it!" while the experiment system code is, in response, continually attempting to revert back to the modified element "Extra! Extra! Read all About it!," processing logic may prevent the experiment system code from attempting to revert the headline in the future. Optionally, at block 510, processing logic may log an overheating event corresponding to the modified element. If, at block 506, processing logic determines that reapplying the original modification to the updated modified element would result in performance degradation of the dynamic web page, flow may continue to block 512, in which processing logic reapplied and displays the original modification to the updated modified element.

Figure 6:
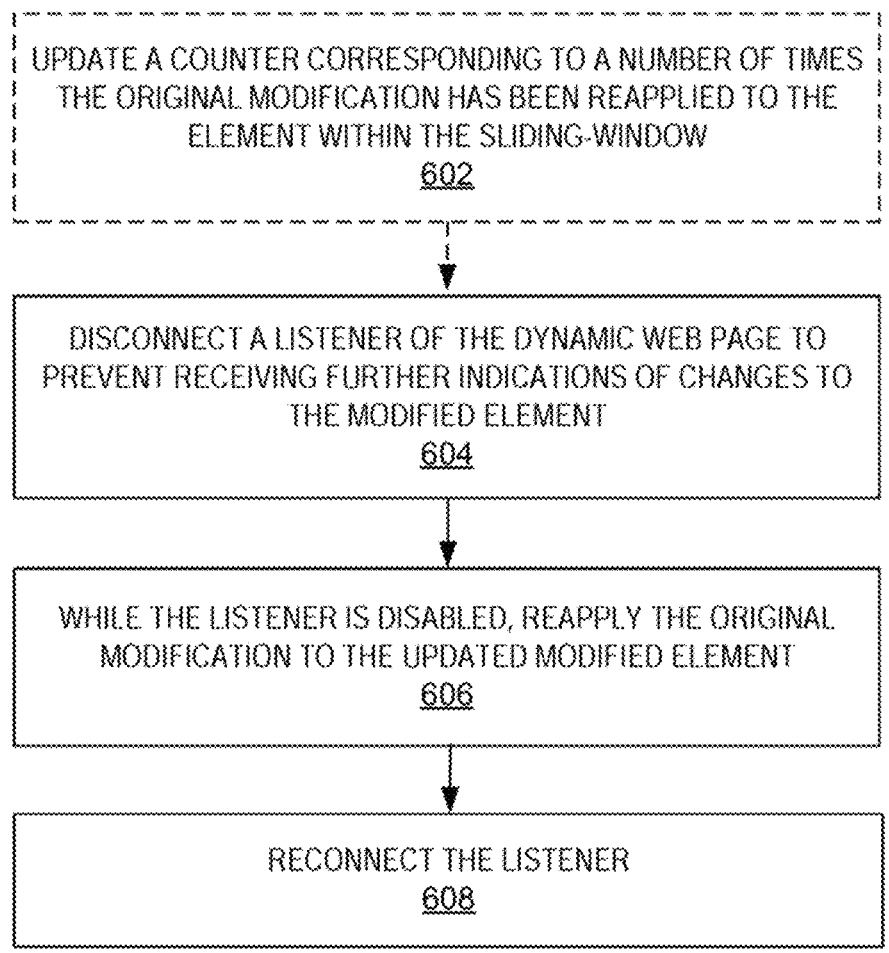
FIG. 6 is a second flow diagram of a method of infinite-loop detection for dynamic websites and applications, according to one embodiment.

FIG. 6 is a second flow diagram of a method of infinite-loop detection for dynamic websites and applications, according to one embodiment. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by client device 102 of FIG. Some or all of the steps may be performed by other entities in other embodiments. In addition, other embodiments may include different and/or additional steps, and the steps may be performed in different orders. In one embodiment, method 600 provides additional detail regarding how processing logic may determine that the updated modified element has been reverted back to the modified element more than a threshold number of times within the sliding-window time period. In other embodiments, other techniques may be used.

In one embodiment, JavaScript code in web browsers and other environments can create MutationObservers (or other listeners) to be alerted to changes to the web page or application. The calling code receives the alert with microtask timing, that is, very soon after the change actually occurs, and before any macrotasks are processed from a macrotask queue. In one embodiment, on macrotask at a time is processed from the macrotask queue. Subtasks, or microtasks, are then performed for that macrotask. When all microtasks from the microtask queue have been completed, another macrotask is selected from the macrotask queue for execution.

Some browsers or other applications may provide a slower MutationObserver implementation. Alternatively, some websites when run in some browsers may overwrite the browser's implementation with a slower implementation or may fill in for a missing browser implementation with a slower implementation, such that JavaScript code that creates a MutationObserver will be alerted to changes with macrotask timing, potentially after one or more other macrotasks have been processed from the macrotask queue. A substitute implementation of functionality is sometimes called a shim or a polyfill.

The experiment system described herein may use MutationObservers or other techniques to detect changes, and potentially modify elements, with microtask or macrotask timing. Other scripts on a web page (e.g., third-party content providers) may use MutationObservers or other techniques to detect changes, and potentially update elements, with microtask or macrotask timing. As described herein, when a variety of systems is capable of independently modifying or updating an particular element, there is the possibility of a loop wherein the experimentation platform and another script may respond to each other's changes. If both responses occur in microtasks, processing logic may rely on the functionality described in FIG. 6 to avoid propagating the loop. Alternatively, if either response is in a macrotask, then processing logic may rely on the functionality described in FIG. 5 to avoid propagating the loop at too quick a rate.

Method 600 begins with processing logic at block 602 by updating a counter corresponding to a number of times the original modification has been reapplied to the element within the sliding-window time period. At block 604, processing logic disconnects a listener (e.g., MutationObserver) of the dynamic web page to prevent receiving further indications of changes to the modified element (e.g., such that changes that occur in microtask timing are not counted). In one embodiment, each element on web page corresponds to a distinct listener.

At block 606, while the listener is disabled, processing logic reapplies the original modification to the modified element. At block 608, processing logic reconnects the listener (such that changes that occur in macrotask timing will be counted). Advantageously, this allows updates (e.g., synchronous updates in microtask timing) to the element within the same micro-process, without affecting the monitoring and counting of changes that occur in macrotask timing. In some embodiments, only asynchronous updates e.g., executed outside of the microprocess) are counted. In one embodiment, the threshold number of times and the sliding-window time period are configurable with default values of approximately five (e.g., plus or minus three) and one second (e.g., plus or minus 500 milliseconds), respectively.

Figure 7:
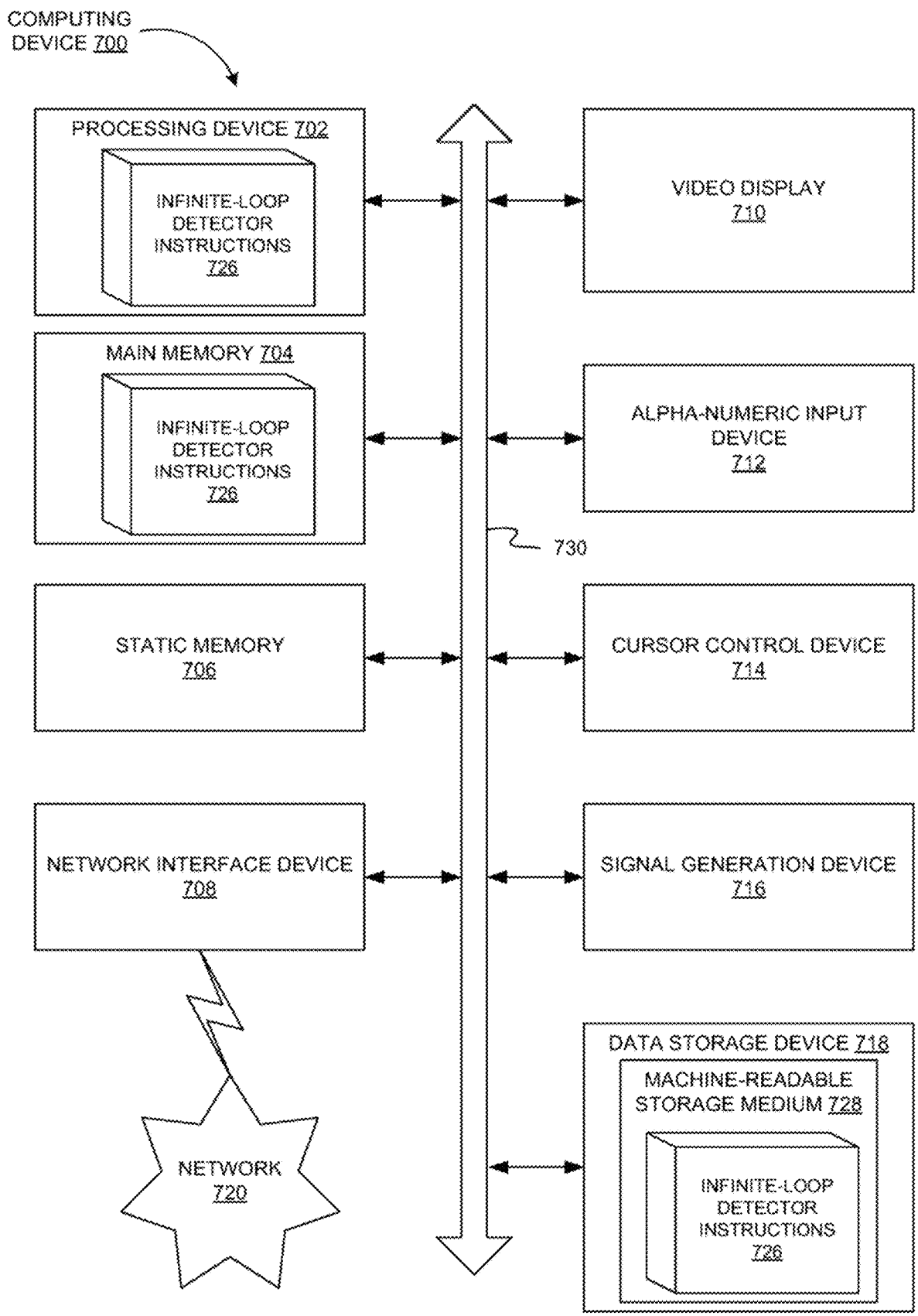
FIG. 7 is a block diagram of a computing device, in accordance with some embodiments of the present disclosure.

FIG. 7 is a block diagram of an example computing device 700 that may perform one or more of the operations described herein, in accordance with some embodiments. In various embodiments, computing device 700 may represent computing devices (e.g., servers) of the experimentation platform, third-party content provider client devices, and/or third-party content provider servers. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interlace device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions 726, e.g., instructions for carrying out the operations described herein, in accordance with one or more aspects of the present disclosure. Overheating detector instructions 726 may also reside, completely or at least partially, within main memory 704 and/or within processing device 702 during execution thereof by computing device 700, main memory 704 and processing device 702 also constituting computer-readable media. The instructions 726 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    displaying a dynamic web page received from a content provider on a client device, wherein the dynamic web page comprises a modified element having an original modification;
    receiving an indication that the modified element was updated to an updated modified element;
    in response to receiving the indication, determining, by a processing device, the original modification to the updated modified element is in an infinite loop on the dynamic web page by determining that the original modification has been reapplied to the element more than a threshold number of times within a sliding-window time period; and
    based on the determination, displaying the updated modified element on the dynamic web page while preventing the application of the original modification to the updated modified element.

2. The method of claim 1, the method further comprising:
    disconnecting a listener of the dynamic web page to prevent receiving further indications of changes to the modified element;
    while the listener is disabled, reapplying the original modification to the updated modified element; and
    reconnecting the listener.

3. The method of claim 1, wherein the threshold number of times and the sliding-window time period are configurable with default values of approximately five and one second, respectively.

4. The method of claim 2, wherein the indication is received via a macrotask, when the listener is connected.

5. The method of claim 2, wherein the indication is received via a microtask, when the listener is disconnected.

6. The method of claim 1, further comprising logging an infinite-loop event corresponding to the modified element.

7. A system comprising:
    a memory to store a dynamic web page; and
    a processing device, operatively coupled to the memory, to:
        display the dynamic web page received from a content provider on a client device, wherein the dynamic web page comprises a modified element having an original modification;
        receive an indication that the modified element was updated to generate an updated modified element;
        in response to receiving the indication, determine that the original modification has been reapplied to the element more than a threshold number of times within a sliding-window time period indicating an infinite loop on the dynamic web page; and
        based on the determination, display the updated modified element on the dynamic web page while preventing the application of the original modification to the updated modified element.

8. The system of claim 7, the processing device further to:
disconnect a listener of the dynamic web page to prevent receiving further indications of changes to the modified element;
while the listener is disabled, reapply the original modification to the updated modified element; and
reconnect the listener.

9. The system of claim 7, wherein the threshold number of times and the sliding-window time period are configurable with default values of approximately five and one second, respectively.

10. The system of claim 8, wherein the indication is received via a macrotask, when the listener is connected.

11. The system of claim 8, wherein the indication is received via a microtask, when the listener is disconnected.

12. The system of claim 7, the processing device further to log an infinite-loop event corresponding to the modified element.

13. A non-transitory computer-readable storage medium including instructions that, when executed by a processing device, cause the processing device to:
display a dynamic web page received from a content provider on a client device, wherein the dynamic web page comprises a modified element having an original modification;
receive an indication that the modified element was updated to generate an updated modified element;
in response to receiving the indication, determine, by the processing device, that the original modification has been reapplied to the element more than a threshold number of times within a sliding-window time period indicating an infinite loop on the dynamic web page; and
based on the determination, display the updated modified element on the dynamic web page while preventing the application of the original modification to the updated modified element.

14. The non-transitory computer-readable storage medium of claim 13, wherein the threshold number of times and the sliding-window time period are configurable with default values of approximately five and one second, respectively.

15. The non-transitory computer-readable storage medium of claim 13, the processing device further to:
disconnect a listener of the dynamic web page to prevent receiving further indications of changes to the modified element;
while the listener is disabled, reapply the original modification to the updated modified element; and
reconnect the listener.

16. The non-transitory computer-readable storage medium of claim 15, wherein the indication is received via a macrotask, when the listener is connected.

17. The non-transitory computer-readable storage medium of claim 15, wherein the indication is received via a microtask, when the listener is disconnected.

* * * * *